(12) United States Patent
Chung et al.

(10) Patent No.: US 12,494,875 B2
(45) Date of Patent: Dec. 9, 2025

(54) METHOD AND APPARATUS FOR DOWNLINK TRANSMISSION AND RECEPTION IN WIRELESS COMMUNICATION SYSTEM

(71) Applicant: LG ELECTRONICS INC., Seoul (KR)

(72) Inventors: Jaehoon Chung, Seoul (KR); Hyungtae Kim, Seoul (KR); Jiwon Kang, Seoul (KR); Kyuseok Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 529 days.

(21) Appl. No.: 17/974,307

(22) Filed: Oct. 26, 2022

(65) Prior Publication Data

US 2023/0246763 A1    Aug. 3, 2023

(30) Foreign Application Priority Data

Jan. 28, 2022   (KR) .......................... 10-2022-0013718

(51) Int. Cl.
*H04L 5/00*   (2006.01)
(52) U.S. Cl.
CPC .................................. *H04L 5/0048* (2013.01)
(58) Field of Classification Search
CPC .................................................... H04L 5/0048
See application file for complete search history.

(56) References Cited

U.S. PATENT DOCUMENTS

2022/0116859 A1*   4/2022   Park .................. H04L 5/0023
2022/0312458 A1*   9/2022   Sun .................... H04L 5/0023

FOREIGN PATENT DOCUMENTS

CN   111867098 A   * 10/2020   .......... H04W 72/042
CN   113260058 A   *  8/2021   .......... H04L 5/0053

* cited by examiner

*Primary Examiner* — Samina F Choudhry
(74) *Attorney, Agent, or Firm* — BRYAN CAVE LEIGHTON PAISNER LLP

(57) ABSTRACT

A method and an apparatus for transmitting and receiving channel state information (CSI) in a wireless communication system are disclosed. A method of performing downlink reception by a user equipment (UE) in a wireless communication system according to an embodiment of the present disclosure may comprise: receiving, from a base station, configuration information for two or more control resource set (CORESET) groups, each of the two or more CORESET groups including at least one CORESET; receiving, from the base station, information indicating two or more transmission configuration indicator (TCI) states; and based on the two or more TCI states, updating TCI state information for the two or more CORESET groups. Here, at least one of the two or more CORESET groups may include a specific CORESET associated with a plurality of TCI states.

18 Claims, 10 Drawing Sheets

METHOD AND APPARATUS FOR DOWNLINK TRANSMISSION AND RECEPTION IN WIRELESS COMMUNICATION SYSTEM

CROSS-REFERENCE TO RELATED APPLICATIONS

This application claims the benefit of earlier filing date and right of priority to Korean Application No. 10-2022-0013718, filed on Jan. 28, 2022, the contents of which are all hereby incorporated by reference herein in their entirety.

TECHNICAL FIELD

The present disclosure relates to a wireless communication system, and more particularly, to a method and apparatus for performing downlink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for performing downlink transmission and reception in a wireless communication system.

In addition, an additional technical object of the present disclosure is, in relation to downlink transmission and reception, to provide a method and apparatus for changing/updating the TCI state for a downlink Multi-Transmission and Reception Point (M-TRP) based on a unified transmission configuration indicator (TCI) framework.

The technical objects to be achieved by the present disclosure are not limited to the above-described technical objects, and other technical objects which are not described herein will be clearly understood by those skilled in the pertinent art from the following description.

A method for performing downlink reception by a user equipment in a wireless communication system according to an aspect of the present disclosure may comprise: receiving, from a base station, configuration information for two or more control resource set (CORESET) groups, each of the two or more CORESET groups including at least one CORESET; receiving, from the base station, information indicating two or more transmission configuration indicator (TCI) states; and based on the two or more TCI states, updating TCI state information for the two or more CORESET groups. Here, at least one of the two or more CORESET groups may include a specific CORESET associated with a plurality of TCI states.

A method for performing downlink transmission by a base station in a wireless communication system according to an aspect of the present disclosure may comprise: transmitting, to a user equipment (UE), configuration information for two or more control resource set (CORESET) groups, each of the two or more CORESET groups including at least one CORESET; and transmitting, to the UE, information indicating two or more transmission configuration indicator (TCI) states. Here, TCI state information for the two or more CORESET groups may be updated based on the two or more TCI states, and at least one of the two or more CORESET groups may include a specific CORESET associated with a plurality of TCI states.

According to an embodiment of the present disclosure, a method and apparatus performing downlink transmission and reception in a wireless communication system may be provided.

In addition, according to an embodiment of the present disclosure, in relation to downlink transmission and reception, a method and apparatus for changing/updating TCI status for downlink M-TRP based on a unified TCI framework may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
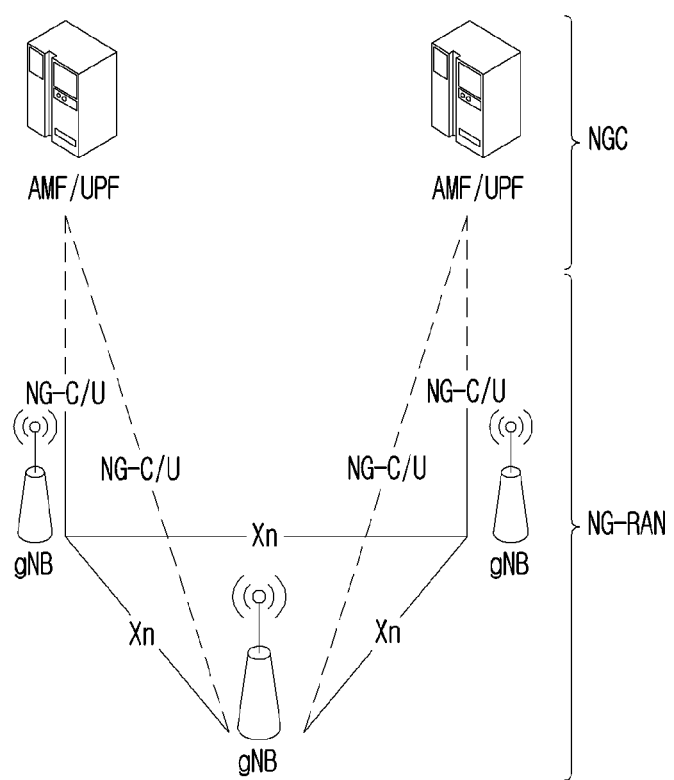
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
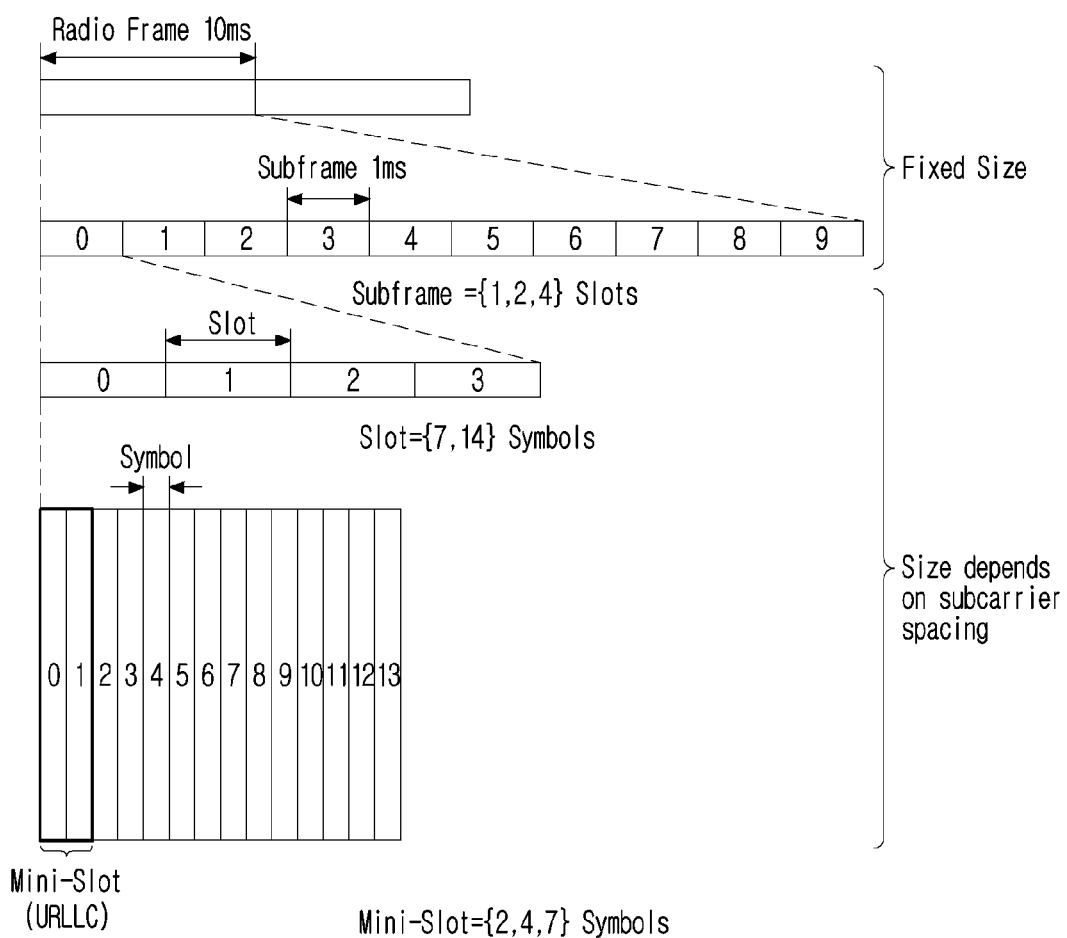
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$, is $480 \cdot 10^3$ Hz and $N_f$ is 4096. Downlink and uplink transmission is configured (organized) with a radio frame having a duration of $T_f=1/(\Delta f_{max}N_f/100) \cdot T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{stat}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
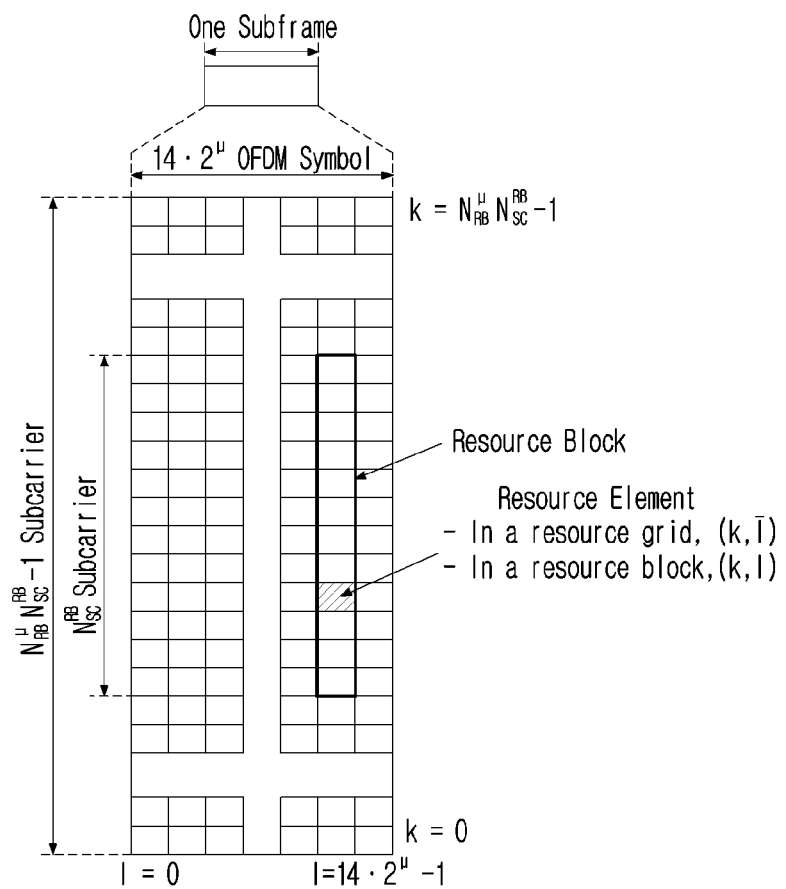
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for p and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration p in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BMP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
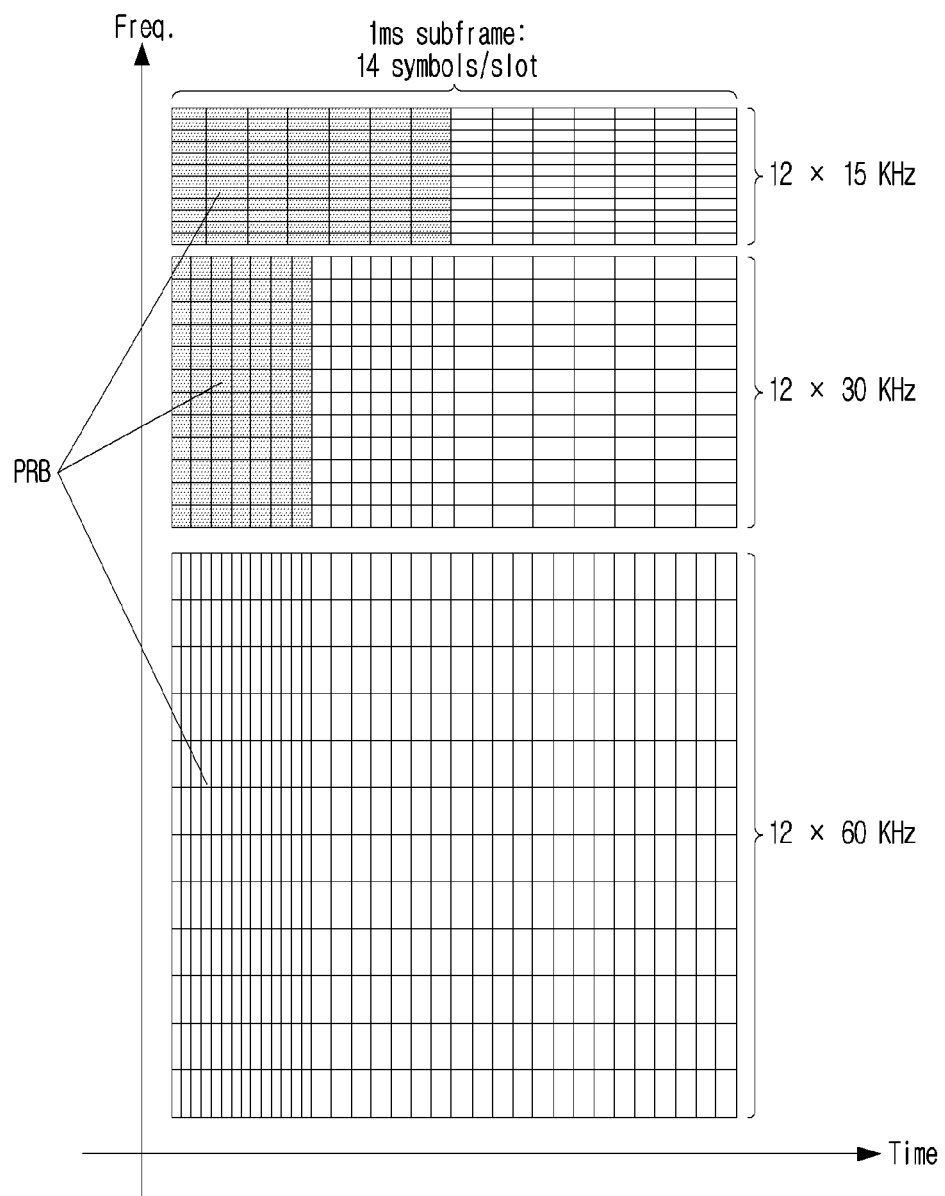
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
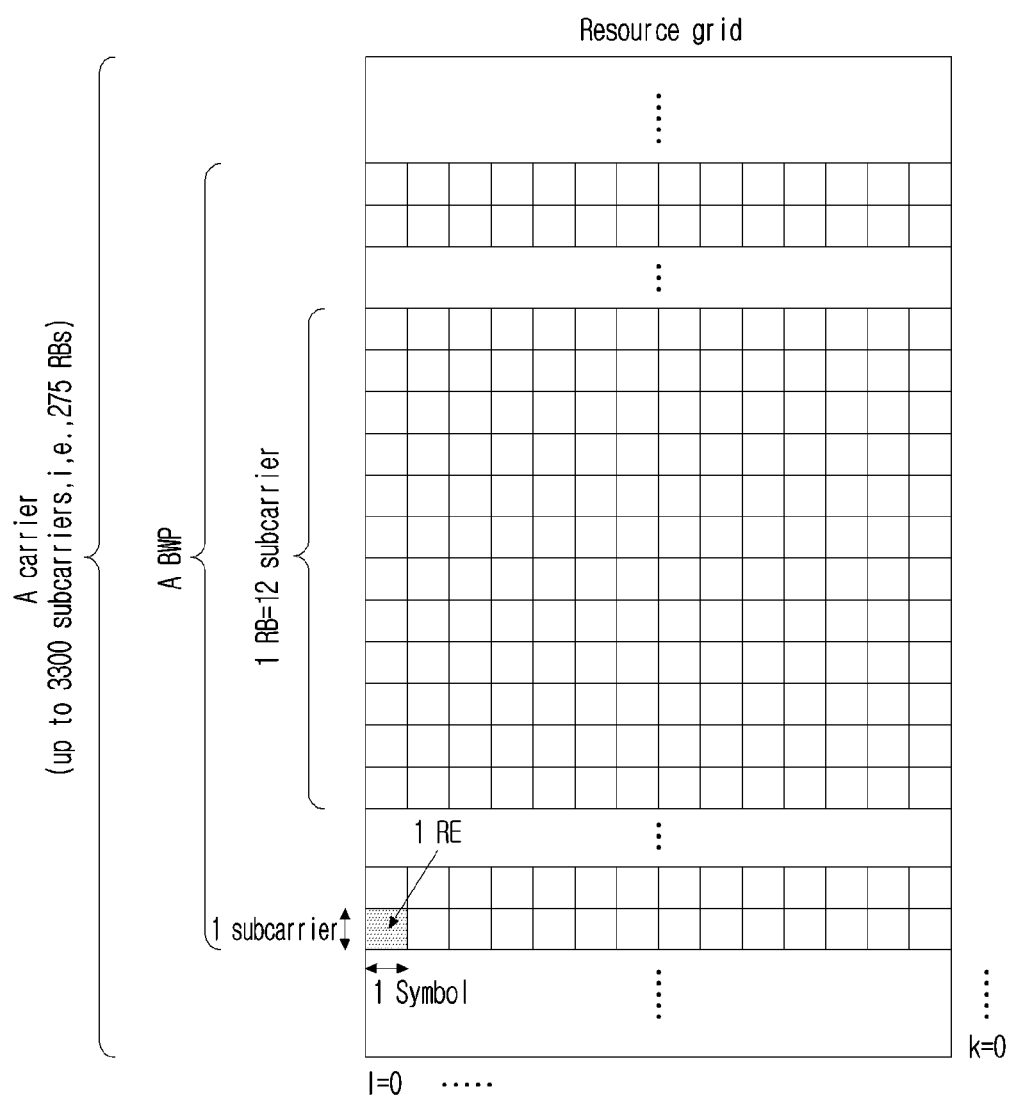
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
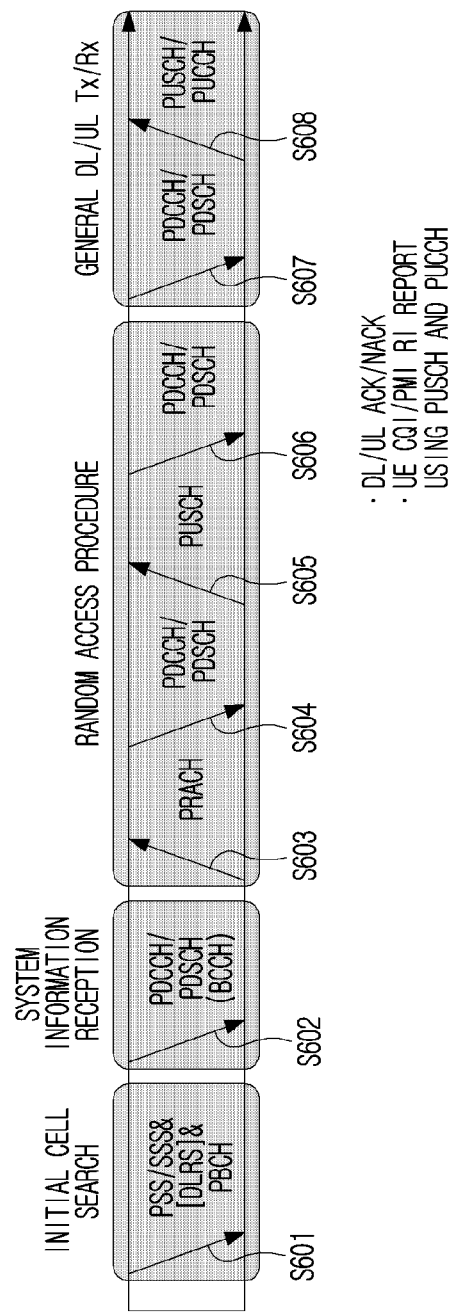
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be predefined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.
Each NZP CSI-RS port configured for interference measurement corresponds to an interference transmission layer.
All interference transmission layers of an NZP CSI-RS port for interference measurement consider EPRE (energy per resource element) ratio.
A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset(Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Multiple TRP (M-TRP) Related Operation

Figure 7:
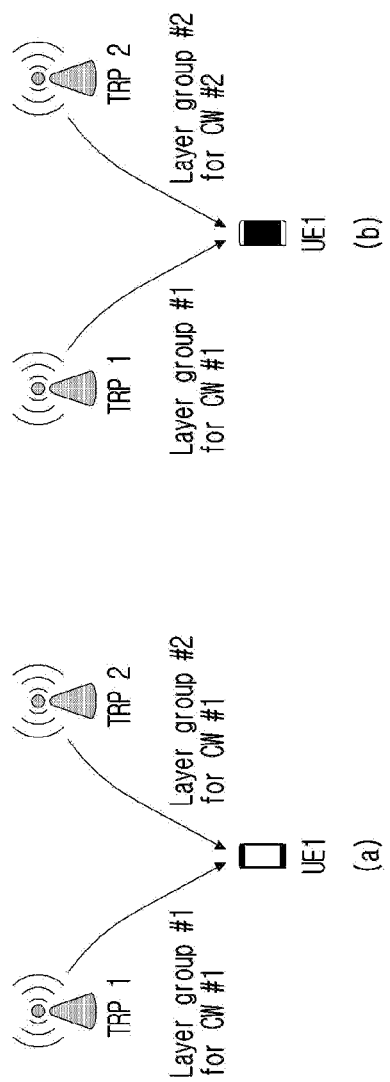
FIG. 7 illustrates a multiple Transmission and Reception Point (TRP) transmission scheme in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be extended and applied to a frequency division multiplexing (FDM) method based on different frequency domain resources (e.g., RB/PRB (set), etc.) and/or a time division multiplexing (TDM) method based on different time domain resources (e.g., slots, symbols, sub-symbols, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a.

The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a
  A single codeword having one RV is used for all resource allocation. With regard to UE, common RB matching (mapping of a codeword to a layer) is applied to all resource allocation.
2-b) Method 2b
  A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot
  Each transmission time (occasion) of a TB has time granularity of a mini-slot and has one TCI and one RV.
  A common MCS is used with a single or multiple DMRS port(s) at all transmission time (occasion) in a slot.
  A RV/TCI may be the same or different at a different transmission time (occasion).

4) Method 4 (TDM): N (n<=Nt2) TCI States in K (n<=K) Different Slots
  Each transmission time (occasion) of a TB has one TCI and one RV.
  All transmission time (occasion) across K slots uses a common MCS with a single or multiple DMRS port(s).
  A RV/TCI may be the same or different at a different transmission time (occasion).

Downlink Multiple TRP (M-TRP) URLLC Transmission Operation

DL MTRP URLLC transmission method means that multiple TRPs transmit the same data/DCI by using a different space (e.g., layer, port)/time/frequency resource. For example, TRP 1 transmits the specific data/DCI in resource 1 and TRP 2 transmits the specific data/DCI (i.e., same data/DCI) in resource 2

UE configured with a DL MTRP-URLLC transmission method receives the same data/DCI by using a different layer/time/frequency resource. Here, UE may receive an indication of the QCL RS/type (i.e., DL TCI state) used in the space/time/frequency resource for receiving the corresponding data/DCI from the base station.

For example, when the data/DCI is received in resource 1 and resource 2, a DL TCI state used in resource 1 and a DL TCI state used in resource 2 may be indicated. UE may achieve high reliability because it receives the data/DCI through resource 1 and resource 2. Such DL MTRP URLLC may be applied to a PDSCH/a PDCCH.

UL MTRP-URLLC transmission method means that multiple TRPs receive the same data/UCI from any UE by using a different space/time/frequency resource. For example, TRP 1 may receive the same data/DCI from UE in resource 1 and TRP 2 may receive the same data/DCI from UE in resource 2. And, TRP 1 and TRP 2 may share data/UCI received from the UE through a backhaul link (connected between TRPs).

That is, UE configured with a UL MTRP-URLLC transmission method may transmit the same data/UCI by using a different space/time/frequency resource. Here, the UE may be indicated by the base station for a Tx beam and Tx power (i.e., UL TCI state) to be used in space/time/frequency resources for transmitting the same data/UCI. For example, when the same data/UCI is transmitted in resource 1 and resource 2, the UE may be indicated by the base station to indicate the UL TCI state used in resource 1 and the UL TCI state used in resource 2 from the base station. This UL M-TRP URLLC may be applied to PUSCH/PUCCH.

In addition, in describing the present disclosure, when receiving/transmitting data/DCI/UCI through a specific space/time/frequency resource, using (or mapping) a specific TCI state (or TCI) may mean that, for DL, estimating a channel from the DMRS using the QCL type and QCL RS indicated by a specific TCI state in a specific space/time/frequency resource, and receiving/demodulating data/DCI/UCI with the estimated channel.

In addition, when receiving/transmitting data/DCI/UCI through a specific space/time/frequency resource, using (or mapping) a specific TCI state (or, TCI) may mean that, for UL, DMRS and data/UCI are transmitted/modulated using a Tx beam and/or Tx power indicated by a specific TCI state in a specific space/time/frequency resource.

And, the UL TCI state may include Tx beam or Tx power information of the UE. In addition, the base station may configure spatial relation information or the like for the UE through other parameters instead of the TCI state.

For example, the UL TCI state may be directly indicated to the UE through a UL grant DCI. Alternatively, the UL TCI state may mean spatial relationship information of an SRS resource indicated through an SRS resource indicator (SRI) field of a UL grant DCI. Alternatively, the UL TCI state may mean an open loop (OP) Tx power control parameter connected to a value indicated through the SRI field of the UL grant DCI.

Here, the OL Tx power control parameter may include, for example, j (index and alpha for OP parameter(s) Po (maximum 32 parameter values set per cell), q_d (index of DL RS resources for PL (path loss) measurement (up to 4 measurements per cell), or/and I (closed loop power control process index (up to 2 processes per cell)).

As another embodiment of the present disclosure, the M-TRP eMBB transmission method refers to a method in which M-TRP transmits different data/DCI using different space/time/frequency resources. If the M-TRP eMBB transmission method is configured, it may be assumed that the UE receives a plurality of TCI states from the base station through DCI, and that data received using QCL RSs indicated by each of the plurality of TCI states are different from each other.

In addition, since the RNTI for M-TRP URLLC and the M-TRP eMBB RNTI are separately used, the UE may determine whether a specific transmission/reception is M-TRP URLLC transmission/reception or M-TRP eMBB transmission/reception. For example, when RNTI for URLLC is used and CRC masking is performed for DCI, the UE may determine the corresponding transmission as URLLC transmission. In addition, when the RNTI for eMBB is used and CRC masking is performed for DCI, the UE may determine the corresponding transmission as eMBB transmission. As another example, the base station may configure the M-TRP URLLC transmission/reception method or the M-TRP eMBB transmission/reception method to the UE through new signaling.

For convenience of description of the present disclosure, it has been assumed that 2 TRPs cooperate with each other to perform a transmission/reception operation, but the present disclosure is not limited thereto. That is, the present disclosure may be extended and applied even in a multi-TRP environment of 3 or more, and may be extended and applied even in an environment in which transmission/reception is performed in different panels or beams in the same TRP. The UE may recognize different TRPs as different TCI states.

That the UE transmits/receives data/DCI/UCI using TCI state 1 means that it transmits/receives data/DCI/UCI/ from TRP 1 (or to TRP 1).

The present disclosure may be utilized in a situation in which the M-TRP cooperatively transmits the PDCCH (repetitively transmits or divides the same PDCCH). In addition, the present disclosure may be utilized in a situation in which M-TRP cooperatively transmits PDSCH or cooperatively receives PUSCH/PUCCH.

In addition, in describing the present disclosure, repeatedly transmitting the same PDCCH by a plurality of base stations (M-TRP) may mean transmitting the same DCI through a plurality of PDCCH candidates and has the same meaning that multiple base stations repeatedly transmit the same DCI. Here, two DCIs having the same DCI format/size/payload may be viewed as the same DCI.

Alternatively, if the scheduling results are the same even if the payloads of the two DCIs are different, the two DCIs may be regarded as the same DCI. For example, the time domain resource allocation (TDRA) field of DCI may relatively determine the slot/symbol position of data and the slot/symbol position of A(ACK)/N(NACK) based on the reception time of the DCI.

In this case, when the DCI received at time n and the DCI received at time n+1 indicate the same scheduling result to the UE, the TDRA fields of the two DCIs are different, and as a result, the DCI payload is different from each other. Accordingly, even if the payloads of the two DCIs are different, if the scheduling results are the same, the two DCIs may be regarded as the same DCI. Here, the number of repetitions R may be directly indicated by the base station to the UE or mutually promised.

Alternatively, even if the payloads of the two DCIs are different and the scheduling results are not the same, when the scheduling result of one DCI is a subset of the scheduling result of the other DCI, the two DCIs may be regarded as the same DCI.

For example, if the same data is TDM and repeatedly transmitted N times, DCI 1 received before the first data indicates (or schedules) repetition of data N times, and DCI 2 received before the second data indicates repetition (scheduling) of data N−1. In this case, the scheduling result (or data) of DCI 2 becomes a subset of the scheduling result (or data) of DCI 1, and both DCIs have scheduling results for the same data. Accordingly, even in this case, the two DCIs may be regarded as the same DCI.

And, in describing the present disclosure, dividing and transmitting the same PDCCH by a plurality of base stations may mean that one DCI is transmitted through one PDCCH candidate, but TRP 1 transmits some resources defined for the corresponding PDCCH candidate and TRP 2 transmits the remaining resources.

For example, when TRP 1 and TRP 2 divide and transmit PDCCH candidates corresponding to aggregation level m1+m2, a PDCCH candidate may be divided into PDCCH candidate 1 corresponding to aggregation level m1 and PDCCH candidate 2 corresponding to aggregation level m2, TRP 1 may transmit PDCCH candidate 1, and TPR 2 may transmit PDCCH candidate 2. In this case, TRP 1 and TRP 2 may transmit PDCCH candidate 1 and PDCCH candidate 2 using different time/frequency resources. After receiving the PDCCH candidate 1 and the PDCCH candidate 2, the UE may generate a PDCCH candidate corresponding to the aggregation level m1+m2 and attempt DCI decoding.

In this case, the method in which the same DCI is divided and transmitted to several PDCCH candidates may be implemented in the following two methods.

The first method is a method in which DCI payload (e.g., control information+CRC) is encoded through one channel encoder (e.g., polar encoder) and divided into two TRPs and transmitted. That is, the first method means a method of dividing and transmitting the coded bits obtained according to the encoding result in two TRPs. Here, the entire DCI payload may be encoded in the coded bit transmitted by each TRP, but is not limited thereto, and only some DCI payloads may be encoded.

The second method divides the DCI payload (e.g., control information+CRC) into two DCIs (DCI 1 and DCI 2) and encodes each of them through a channel encoder (e.g., a polar encoder). Thereafter, each of the two TRPs may transmit a coded bit corresponding to DCI 1 and a coded bit corresponding to DCI 2 to the terminal.

That is, dividing/repeating the same PDCCH by a plurality of base stations (M-TRP) and transmitting over a plurality of monitoring occasions (MOs) may mean that 1) the coded bit encoding the entire DCI content of the corresponding PDCCH is repeatedly transmitted through each MO for each base station (S-TRP), 2) the coded bit encoding the entire DCI content of the corresponding PDCCH is divided into a plurality of parts, and each base station (S-TRP) transmits different parts through each MO, or 3) the DCI content of the corresponding PDCCH is divided into a plurality of parts, and different parts are encoded for each base station (S-TRP) (that is, separately encoded) and transmitted through each MO.

Repeatedly/split transmission of the PDCCH may be understood as transmitting the PDCCH multiple times over several transmission occasions (TO).

Here, TO may mean a specific time and/or frequency resource unit in which the PDCCH is transmitted. For example, when the PDCCH is transmitted multiple times (to a specific RB) over slots 1, 2, 3, and 4, TO may mean each slot. As another example, if the PDCCH is transmitted multiple times (in a specific slot) over RB sets 1, 2, 3, and 4, TO may mean each RB set. As another example, if the PDCCH is transmitted multiple times over different times and frequencies, TO may mean each time/frequency resource. In addition, the TCI state used for DMRS channel estimation may be set differently for each TO, and it may be assumed that the TOs in which the TCI state is set differently are transmitted by different TRPs/panels.

Repeatedly transmitting or dividing the PDCCH by a plurality of base stations may mean that the PDCCH is transmitted over multiple TOs, and the union of the TCI states configured in the corresponding TOs consists of two or more TCI states. For example, PDCCH transmitting over TO 1, 2, 3, 4 may mean that TCI states 1, 2, 3, 4 are configured in each of TO 1, 2, 3, 4 and TRP i cooperatively transmits the PDCCH in TO i.

In describing the present disclosure, repeatedly transmitting the same PUSCH to a plurality of base stations (i.e., M-TRP) by the UE may mean that the UE transmits the same data through a plurality of PUSCHs, and each PUSCH may be transmitted by being optimized for UL channels of different TRPs.

For example, the UE may repeatedly transmit the same data through PUSCH 1 and PUSCH 2. In this case, PUSCH 1 may be transmitted using UL TCI state 1 for TRP 1, and link adaptation such as precoder/MCS may also be scheduled to receive a value optimized for the channel of TRP 1 to transmit the PUSCH. PUSCH 2 is transmitted using UL TCI state 2 for TRP 2, and link adaptation such as a precoder/MCS may also be scheduled for a value optimized for the channel of TRP 2 to transmit the PUSCH. In this case, the repeatedly transmitted PUSCH 1 and PUSCH 2 may be transmitted at different times to be TDM, FDM, or SDM.

In addition, in describing the present disclosure, transmitting, by UE to a plurality of base stations (i.e., M-TRP), the same PUSCH by dividing it may mean that one data is transmitted through one PUSCH, but the resources allocated to the PUSCH are divided and optimized for UL channels of different TRPs for transmission.

For example, the UE may transmit the same data through a 10-symbol PUSCH. At this time, the first 5 symbols among 10 symbols may be transmitted using UL TCI state 1 for TRP 1, and the UE may transmit a 5-symbol PUSCH (to TRP 1) by receiving a link adaptation such as precoder/MCS and scheduling a value optimized for a channel of TRP 1. The remaining 5 symbols may be transmitted using UL TCI state 2 for TRP 2, and the UE may transmit the remaining 5-symbol PUSCH (with TRP 2) by receiving a link adaptation such as precoder/MCS and scheduling a value optimized for the channel of TRP 2.

In the above example, a method of dividing one PUSCH into time resources and performing TDM transmission for TRP 1 and TRP 2 has been described. However, the present disclosure is not limited thereto, and the UE may divide and transmit the same PUSCH to a plurality of base stations by using the FDM/SDM method.

The UE may repeatedly transmit the PUCCH to a plurality of base stations (similar to PUSCH transmission) or divide and transmit the same PUCCH.

And, when a plurality of TOs are indicated for the terminal in order to repeatedly transmit PDCCH/PDSCH/PUSCH/PUCCH or divide and transmit PDCCH/PDSCH/PUSCH/PUCCH, for each TO, UL may be transmitted toward a specific TRP, or DL may be received from a specific TRP. At this time, the UL TO (or the TO of TRP 1) transmitted toward TRP 1 may mean a TO using a first value of two spatial relations, two UL TCIs, two UL power control parameters or two pathloss (PL)-RS indicated to the terminal. And, UL TO (or TO of TRP 2) transmitted toward TRP 2 may mean a TO using a second value of two spatial relations, two UL TCIs, two UL power control parameters, or two PL-RSs indicated to the UE.

Similarly, in the case of DL transmission, the DL TO transmitted by TRP 1 (or TO of TRP 1) may mean a TO using a first value of two DL TCI states indicated to the terminal (e.g., when two TCI states are set in CORESET), and the DL TO transmitted by TRP 2 (or TO of TRP 2) may mean a TO using a second value of two DL TCI states indicated to the terminal (e.g., two TCI states are set in CORESET).

The present disclosure may be extended and applied to various channels such as PUSCH/PUCCH/PDSCH/PDCCH. In addition, the present disclosure may be extended and applied to both the case of repeatedly transmitting the channel and the case of dividing and transmitting the channel in different space/time/frequency resources.

In addition, in terms of the DCI transmission, the M-TRP transmission scheme may be divided into i) a multiple DCI (M-DCI)-based M-TRP transmission scheme in which each TRP transmits a different DCI, and ii) a single DCI (S-DCI)-based M-TRP transmission scheme in which one TRP transmits a DCI. For example, in the case of S-DCI, since all scheduling information for data transmitted by the M-TRP need to be transferred through one DCI, it may be used in an ideal BackHaul (ideal BH) environment where dynamic cooperation between two TRPs is possible.

Related to Enhanced M-TRP Transmission and Reception

With respect to M-TRP transmission/reception in Rel-16 NR standardization, PDSCH transmission/reception according to the S-DCI based M-TRP transmission scheme and the M-DCI based M-TRP transmission scheme is supported.

First, an S-DCI based M-TRP PDSCH transmission scheme will be described.

One of SDM/FDM/TDM schemes may be used for S-DCI based M-TRP PDSCH transmission. In the case of SDM, the base station transmits one TB using a multi-layer, but transmits layers belonging to different DMRS CDM groups with different Tx beams (i.e., QCL RS or TCI state). Through this, the transmission capacity may be improved by increasing the number of layers compared to the existing S-TRP transmission scheme. In addition, when one TB is transmitted using multiple layers, some layers are transmitted to TRP 1 and the other layers are transmitted to TRP 2, whereby channel reliability due to diversity gain may be improved.

In the case of FDM, scheme 2a and 2b are supported. Here, scheme 2a is a scheme in which one TB is transmitted using a multi-RB, but RBs belonging to different RB groups are transmitted using different Tx beams (i.e., QCL RS or TCI state). Scheme 2b is a scheme for transmitting the same TB using different RB groups, but transmitting RBs belonging to different RB groups using different Tx beams (i.e., QCL RS or TCI state). In the case of TDM, schemes 3 and 4, are supported. Here, scheme 4 (i.e., inter-slot TDM) is a scheme for repeatedly transmitting the same TB in several slots, but transmitting slots belonging to different slot groups using different Tx beams (i.e., QCL RS or TCI state). On the other hand, Scheme 3 (i.e., intra-slot TDM) is a scheme for repeatedly transmitting the same TB in several OFDM symbol groups, but transmitting some OFDM symbol groups and the remaining OFDM symbol groups using different Tx beams (i.e., QCL RS or TCI state).

Next, an M-DCI based M-TRP PDSCH transmission scheme will be described.

M-DCI based MTRP PDSCH transmission is a scheme in which each TRP schedules and transmits a PDSCH through DCI. That is, TRP 1 transmits PDSCH 1 through DCI 1, and TRP 2 transmits PDSCH 2 through DCI 2. When PDSCH 1 and PDSCH 2 overlap on the same frequency and time resource, since two PDSCHs are received for the same RE, resource efficiency is increased and transmission capacity is increased. For this, the concept of a CORESET pool, which means a group of several CORESETs, has been introduced. For example, TRP 1 transmits a PDCCH through CORESET belonging to CORESET pool 0, and also transmits a PDSCH scheduled by the corresponding PDCCH. TRP 2 transmits a PDCCH through CORESET belonging to CORESET pool 1, and also transmits a PDSCH scheduled by the corresponding PDCCH.

Even in the case of PUSCH, a specific TRP may schedule PUSCH transmission to the UE through CORESET belonging to each CORESET pool. For example, some PUCCH resources may be scheduled by TRP 1, and the remaining PUCCH resources may be scheduled by TRP 2. The UE may transmit an independent PUSCH/PUCCH for each of TRPs 1 and 2.

In addition, the UE may recognize a PUSCH (or PUCCH) scheduled by DCI received based on different CORESETs (or CORESETs belonging to different CORESET groups) as a PUSCH (or PUCCH) transmitted to different TRPs or as a PUSCH (or PUCCH) of a different TRP. In addition, the scheme for UL transmission (e.g., PUSCH/PUCCH) transmitted to different TRPs may be equally applied to UL transmission transmitted to different panels belonging to the same TRP.

In addition, the CORESET group ID (or CORESET pool index with the same meaning) described/mentioned in the present disclosure may mean index/identification information (e.g., ID) for distinguishing CORESET for each TRP/panel. In addition, the CORESET group may mean a group/union of CORESETs distinguished by index/identification information (e.g., ID)/CORESET group ID for distinguishing CORESETs for each TRP/panel. As an example, the CORESET group ID may be specific index information defined in CORESET configuration. That is, the CORESET group may be configured/indicated/defined by the index defined in the CORESET configuring for each CORESET. And/or, the CORESET group ID may mean an index/identification information/indicator for classification/identification between CORESETs configured/related to each TRP/panel.

CORESET group ID described/mentioned in this disclosure may be expressed by being replaced with a specific index/specific identification information/specific indicator for classification/identification between CORESETs set/associated with each TRP/panel. Corresponding information may be configured/indicated through higher layer signaling (e.g., RRC signaling, MAC-CE, etc.) and/or physical layer signaling (e.g., DCI). As an example, it may be configured/indicated to perform PDCCH detection for each TRP/panel in a corresponding CORESET group unit, and UCI (e.g., CSI, HARQ-ACK/NACK, SR, etc.) for each TRP/panel in a corresponding CORESET group unit. And/or uplink physical channel resources (e.g., PUCCH/PRACH/SRS resources) may be configured/indicated to be managed/controlled separately. And/or, HARQ ACK/NACK (process/retransmission) for PDSCH/PUSCH, etc. scheduled for each TRP/panel in units of the corresponding CORESET group may be managed.

For example, the higher layer parameter ControlResourceSet IE (information element) is used to configured a time/frequency control resource set (control resource set, CORESET). The corresponding CORESET may be related to detection/reception of downlink control information. The ControlResourceSet IE may include a CORESET-related ID (e.g., controlResourceSetID)/CORESET pool index for CORESET (e.g., CORESETPoolIndex)/time/frequency resource setting of CORESET/TCI information related to CORESET. As an example, the index of the CORESET pool (e.g., CORESETPoolIndex) may be configured to 0 or 1. In the above description in the present disclosure, a CORESET group may correspond to a CORESET pool, and a CORESET group ID may correspond to a CORESET pool index (e.g., CORESETPoolIndex). The aforementioned ControlResourceSet (ie, CORESET) may be configured through higher layer signaling (e.g., RRC signaling).

Additionally, in relation to M-TRP transmission and reception in Rel-17 NR standardization, M-TRP PDCCH/PDSCH SFN transmission, S-DCI based M-TRP PUSCH repetition transmission, and single PUCCH resource based M-TRP PUCCH repetition transmission are supported. In the transmission schemes, the same contents (i.e., DCI/UL TB/UCI, etc.) are repeatedly transmitted by improving the URLLC target for increasing reliability. Here, M-TRP PDCCH repetition transmission is performed based on TDM or FDM, M-TRP PDCCH/PDSCH SFN transmission is performed in the same time/frequency/layer, and S-DCI based M-TRP PUSCH repetition transmission is performed based on TDM, and a single PUCCH resource based M-TRP PUCCH repetition transmission is performed based on TDM.

First, the S-DCI based M-TRP PDCCH repetition transmission scheme will be described.

In NR Rel-17 standardization, a plurality of CORESETs in which different TCI states (i.e., different QCL RSs) are configured for M-TRP PDCCH repetition transmission are configured to the terminal, and a plurality of SS sets respectively connected to the corresponding CORESETs are configured. The base station may indicate/configured that the SS set connected to one CORESET and the SS set connected to another CORESET are linked for repetition transmission to the terminal. Through this, the terminal may recognize that PDCCH candidates of the corresponding SS set are repeatedly transmitted.

For example, two CORESETs, CORESET 0 and CORESET 1, may be configured to the terminal, CORESET 0 and CORESET 1 may be connected to SS set 0 and SS set 1, respectively, and SS set 0 and SS set 1 may be linked. The terminal may recognize that the same DCI is repeatedly transmitted in the PDCCH candidate of SS set 0 and the PDCCH candidate of SS set 1, and based on a specific rule, the terminal may recognize that the specific PDCCH candidate of SS set 0 and the specific PDCCH candidate of SS set 1 correspond to a pair configured for repeatedly transmitting the same DCI. The two PDCCH candidates may be referred to as linked PDCCH candidates, and when the terminal properly receives any one of the two PDCCH candidates, the corresponding DCI may be successfully decoded. However, when receiving the PDCCH candidate of SS set 0, the terminal may use the QCL RS (i.e., DL beam) of the TCI state of CORESET 0 connected to SS set 0, and when receiving the PDCCH candidate of SS set 1, the terminal may use the QCL RS (ie, DL beam) of the TCI state of CORESET 1 connected to SS set 1. Accordingly, the terminal receives the associated PDCCH candidates using different beams.

Next, the M-DCI based M-TRP PDCCH repetition transmission scheme will be described.

As one of the M-TRP PDCCH repetition transmission types, a plurality of TRPs may repeatedly transmit the same DCI through the same time/frequency/DMRS port, and such a transmission method may be referred to as SFN PDCCH transmission. However, for SFN PDCCH transmission, the base station configures a plurality of TCI states in one CORESET instead of configuring a plurality of CORESETs in which different TCI states are configured. When the terminal receives the PDCCH candidate through the SS set connected to the one CORESET, the terminal may perform channel estimation of the PDCCH DMRS and attempt decoding by using all of the plurality of TCI states.

In addition, during the above-described M-TRP PDSCH repetition transmission, the two TRPs repeatedly transmit the corresponding channel to different resources. However, when the resources used by the two TRPs are the same, that is, when the same channel is repeatedly transmitted through the same frequency/time/layer (i.e., DMRS port), the reliability of the corresponding channel may be improved. In this case, since the same channel repeatedly transmitted is received while being transmitted (i.e., air) because the resources are not distinguished, it may be recognized as one channel (e.g., a composite channel) from a reception side (e.g., terminal). For SFN PDSCH transmission, two DL TCI states for PDSCH DMRS reception may be configured in the terminal.

Next, the S-DCI based M-TRP PUSCH repetition transmission scheme will be described.

In NR Rel-17 standardization, the base station configured two SRS sets to the terminal for S-DCI based M-TRP PUSCH transmission, and each set is used for indicating UL beam/QCL information for a UL Tx port for TRP 1 and TRP 2. In addition, the base station may indicate the SRS resource for each SRS resource set through two SRI fields included in one DCI, and may indicate up to two PC parameter sets. For example, the first SRI field may indicate the SRS resource and PC parameter set defined in SRS resource set 0, and the second SRI field may indicate the SRS resource and PC parameter set defined in SRS resource set 1. The terminal may be indicated with UL Tx port, PC parameter set, and UL beam/QCL information for TRP 1 through the first SRI field, and through this, the terminal performs PUSCH transmission in the TO corresponding to SRS resource set 0. Similarly, the terminal may be indicated with UL Tx port, PC parameter set, and UL beam/QCL information for TRP 2 through the second SRI field, and through this, the terminal performs PUSCH transmission in the TO corresponding to SRS resource set 1.

Next, the Single PUCCH resource based M-TRP PUCCH repetition transmission scheme will be described.

In NR Rel-17 standardization, the base station may activate/configure two spatial relation info on a single PUCCH resource to the terminal for the Single PUCCH resource based M-TRP PUCCH transmission (if FR1, enable/configure two PC parameter sets). When UL UCI is transmitted through the corresponding PUCCH resource, each spatial relation info is used to indicate to the terminal the spatial relation info for TRP 1 and TRP 2, respectively. For example, through the value indicated in the first spatial relation info, the terminal is indicated with Tx beam/PC parameter(s) toward TRP 1, and the terminal perform PUCCH transmission in TO corresponding to TRP 1 using corresponding information. Similarly, through the value indicated in the second spatial relation info, the terminal is indicated with Tx beam/PC parameter(s) toward TRP 2, and the terminal performs PUCCH transmission in the TO corresponding to TRP 2 using the corresponding information.

In addition, for M-TRP PUCCH repetition transmission, the configuring scheme is improved so that two spatial relation info may be configured in the PUCCH resource. That is, when power control (PC) parameters such as PLRS, Alpha, P0, and Closed loop index are set in each spatial relation info, spatial relation RS may be configured. As a result, PC information and spatial relation RS information corresponding to two TRPs may be configured through two spatial relation info. Through this, the terminal transmits UCI (i.e., CSI, ACK/NACK, SR, etc.) PUCCH in the first TO using the first spatial relation info, and transmits the same UCI PUCCH in the second TO using the second spatial relation info. In the present disclosure, a PUCCH resource in which two spatial relation info is configured is referred to as an M-TRP PUCCH resource, and a PUCCH resource in which one spatial relation info is configured is referred to as an S-TRP PUCCH resource.

In the overall description and/or proposed method of the present disclosure, the meaning of using/mapping a specific TCI state (or TCI) when transmitting/receiving data/DCI/UCI for a certain frequency/time/spatial resource may mean, in the case of DL, estimating a channel from the DMRS using the QCL type and QCL RS indicated by the corresponding DL TCI state in the corresponding frequency/time/spatial resource and receiving/demodulating the estimated data/DCI. In addition, in the case of UL, the corresponding meaning may mean transmitting/modulating DMRS and data/UCI using the Tx beam and/or Tx power indicated by the UL TCI state in the corresponding frequency/time/spatial resource.

Here, the UL TCI state may include information for the Tx beam and/or Tx power of the terminal, and spatial relation info, etc. may be configured to the terminal through other parameters instead of the TCI state. The UL TCI state may be directly indicated by the UL grant DCI, and may mean spatial relation info of the SRS resource indicated through the SRI field of the UL grant DCI. Alternatively, the UL TCI state is an Open Loop (OL) Tx power control parameter (e.g., j: index for open loop parameters Po & alpha (maximum 32 parameter value sets per cell), q_d: index of DL RS resource for PL measurement (maximum 4 measurements per cell), l: may mean closed loop power control process index (maximum 2 processes per cell)) connected to a value indicated through the SRI field of the UL grant DCI. In addition, the UL TCI state may be indicated through DL grant DCI as well as UL grant DCI.

In the present disclosure, for convenience of explanation, the proposed method(s) was applied assuming cooperative transmission/reception between 2 TRPs, but the proposed method(s) may be extended and applied even in a multi-TRP environment of 3 or more, and multiple It may be extended and applied even in the panel environment. Here, different TRPs may be recognized by the terminal as different TCI states, and when the terminal transmits and receives data/DCI/UCI using the first TCI state (i.e., TCI state 1), it may mean transmitting and receiving data/DCI/UCI to/from first TRP (i.e., TRP 1).

In the present disclosure, TO (Transmission Occasion) may mean each channel transmitted at different times when multiple channels are TDMed, and when multiple channels are FDM, it may mean each channel transmitted at different frequencies/RBs, and when multiple channels are SDM, it may mean each channel transmitted to a different layer/beam/DMRS port. One TCI state may be mapped to each TO. When the same channel is repeatedly transmitted, intact data/DCI/UCI is transmitted to one TO, and the receiving side may receive multiple TOs and then the reception success rate may be increased.

A Method of Change/Update for M-TRP-Related Common Beam

In the previous Rel-15/16 NR standardization, higher layer signaling (e.g., RRC signaling, MAC-CE based signaling, etc.) is used for beam indication/update operation for transmission and reception between the base station and the terminal, and for some channels (e.g., PDSCH, PUSCH, etc.)/RSs, a DCI-based beam indication operation has been supported.

In addition, in Rel-17 NR standardization, a dynamic beam update operation using a joint DL/UL TCI state and a separate DL/UL TCI state has been introduced. In this regard, standardization of a UE-common beam update operation, which is a method of performing, by the base station, indication/update with a common beam to a plurality of specific channel/RS combinations of the terminal using DCI, has been proceeded.

For example, in the case of DL, the channel/RS that is the target of the common beam update may correspond to UE-dedicated CORESET, PDSCH (e.g., UE transmission reception PDSCH), CSI-RS (e.g., Aperiodic CSI-RS for tracking/beam management (BM)), and the like. In the case of UL, the channel/RS that is the target of the common beam update may correspond to a PUSCH (e.g., a dynamic grant-based PUSCH, a configured grant-based PUSCH, etc.), a dedicated PUCCH (e.g., all or some UE-dedicated PUCCH), SRS, and the like.

Table 6 below shows Rel-17 NR standardization agreements related to the above-mentioned joint DL/UL TCI state and the separated DL/UL TCI state.

TABLE 6

Conclusion

On Rel. 17 unified TCI framework, based oil the agreements in RAN1#102-e and 103-e, the following terms are defined as follows (at least for the purpose of discussion and reaching agreements).
For M = 1:
DL TCI: The source reference signal(s) (analogous to Rel. 15, two, if qcl_Type2 is configured in addition to qcl_Type1) in the DL TCI provides QCL information at least for UE-dedicated reception on PDSCH and all of CORESETs in a CC
For N = 1:
UL TCI: The source reference signal in the UL TCI provides a reference for determining UL TX spatial filter at least for dynamic-grant/configured-grant based PUSCH and all of dedicated PUCCH resources in a CC
For M = N = 1:
Joint DL/UL TCI: A TCI refers to at least a common source reference RS used for determining both the DL QCL information and the UL TX spatial filter.
Separate DL/UL TCI: The DL TCI and UL TCI are distinct (therefore, separate).
For M > 1:
DL TCI: Each of the M source reference signals (or 2M, if qcl_Type2 is configured in addition to qcl_Type1) in the M DL TCIs provides QCL information at least for one of the M beam pair links for UE-dedicated receptions on PDSCH and/or subset of CORESETs in a CC
For N > 1:
UL TCI: Each of the N source reference signals in the N UL TCIs provide a reference for determining UL TX spatial filter at least for one of the N beam pair links associated with dynamic-grant(s)/configured-grant(s) based PUSCH, and/or subset of dedicated PUCCH resources in a CC
For M > 1 and/or N > 1:
Joint DL/UL TCI: A TCI refers to at least a common source reference RS used for determining both the DL QCL information and the UL TX spatial filter. In this case, M = N.
Separate DL/UL TCI: The M DL TCIs and N UL TCIs are distinct (therefore, separate).

Note:
Other TCI types/terms such as "common TCI" are not used.

In Rel-17 NR standardization, enhancement of the beam indication operation has progressed mainly for the single-TRP (S-TRP) operation. That is, methods for a case where the number of DL/UL TCI states for a common beam is M=1 or N=1 were considered. Based on the TCI state (e.g., joint/separate TCI state) in the indicated Rel-17, the target channel/RS to which the common beam (i.e., common beam applicability) will be applied may be as follows according to the M value in terms of DL.

For example, when M is 1 (i.e., when a single TCI state is indicated in terms of DL), the common beam may be applied to a UE-dedicated reception in all CORESETs (or PDCCHs) and PDSCH, a non-UE dedicated PDSCH/PDCCH associated with a serving cell physical cell ID (PCI), and/or an aperiodic (AP) CSI-RS for BM/CSI. On the other hand, when M is greater than 1 (i.e., when a plurality of TCI states are indicated in terms of DL), the common beam may be applied to a UE-dedicated reception in a subset of CORESETs and/or PDSCH, a subset a non-terminal dedicated PDSCH/PDCCH associated with a serving cell Physical Cell ID (PCI), and/or a subset of aperiodic CSI-RS for BM/CSI.

In addition, in Rel-18 NR standardization, a discussion on the content (i.e., M>1 or N>1) extending the above-described operation to an Multi-TRP (M-TRP) operation will be conducted.

As an example, using a unified TCI framework in Rel-17 NR standardization, a method of indicating multiple DL/UL TCI states in an M-TRP operation may be considered. In this case, in terms of DL, operations according to a plurality of M values need to be defined and extended, and the above-described M-TRP-based SFN PDCCH repetition transmission scheme may be considered.

As described above in present disclosure, M-TRP-based SFN PDCCH repetition transmission may be a specific type of PDCCH repetition transmission and may mean that multiple TRPs repeatedly transmit the same DCI through the same time/frequency/layer.

Unlike the conventional method (e.g., in case of existing PDCCH repetition transmission, a plurality of CORESETs in which different TCI states are configured to the terminal), the base station may configure a plurality of TCI states to one CORESET for SFN PDCCH transmission.

(Example 1) For example, three CORESETs (i.e., CORESET #0, CORESET #1, CORESET #2) may be configured. Here, when CORESET #2 corresponds to SFN CORESET, CORESET #0 may configured in associated with TCI state #0, CORESET #1 may configured in associated with TCI state #1, and CORESET #2 may configured in TCI state #0/TCI state #1.

In the case of Example 1), the base station may configure an enabler for the corresponding SFN CORESET through RRC signaling. If two TCI states are activated in the corresponding SFN CORESET through MAC-CE, the base station may perform SFN PDCCH repetition transmission.

In addition, with respect to common beam applicability considering the unified TCI framework, when M is 1, common beam applicability may be applied to all CORESETs, and when M is 2, a subset of two CORESETs may be configured set, so that the two indicated TCI states may be applied respectively. At this time, when two indicated TCI states are utilized for common beam applicability through DCI as in the case where M is 2, for convenience of explanation in the present disclosure, each TCI state is referred as a common TCI state #1 and a common TCI state #2.

In the present disclosure, the meaning of applying common beam applicability may mean commonly applying the indicated TCI state to a channel/RS for DL/UL.

As described above, when the common beam applicability for the indicated TCI state is applied to CORESET, as in Example 2) below, in case that two TCI states are activated for the purpose of SFN PDCCH repetition transmission for the corresponding CORESET, an ambiguity about beam update may occur.

(Example 2) For example, when M is 2, by configuring a subset for CORESET for Example 1, two common TCI states may be applied, respectively. Specifically, CORESET subset #1 may consist of CORESET #0 and CORESET #2 and may be associated with a common TCI state #1. And, CORESET subset #2 may consist of CORESET #1 and may be associated with a common TCI state #2. At this time, two TCI states are configured in CORESET #2 (i.e., SFN CORESET), but there is one common TCI state to be applied.

Therefore, in the present disclosure, in the M-TRP-based PDCCH repetition transmission using the unified TCI state (i.e., joint and/or DL/UL TCI state), common beam adaptability operation methods based on the unified TCI framework in Rel-17 NR standardization will be described.

Embodiment 1

This embodiment relates to a beam configuring/updating method for SFN CORESET according to M value configuration, when an operation according to common beam applicability is applied through an unified TCI framework-based TCI state indication. Here, the M value may mean the number of TCI states configured/indicated for the above-described M-TRP-based downlink transmission/reception and/or the number of objects to which a common beam change/update operation is applied.

This embodiment proposes a method of performing beam change/update in a M-TRP SFN PDCCH repetition transmission operation through an unified TCI framework. As described above, in applying common beam applicability, a plurality of indicated TCI states in terms of DL and a plurality of subsets for a target channel/RS to which it is applied may be configured (e.g., M=2). At this time, since two TCI states are configured to a CORESET enabled for SFN usage, methods for performing TCI state change/update based on a plurality of indicated TCI states will be described.

In this regard, in order to apply common beam applicability to general CORESET and SFN CORESET, when M is a value greater than 1 (hereinafter, exemplified as M=2 for convenience of description) a subset for a target channel/RS may be considered. A method of applying common beam applicability based on the corresponding subset and a method of applying common beam applicability regardless of the corresponding subset will be described.

First, when the M value for SFN CORESET is 2, a CORESET subset-based beam setup/update method is proposed.

As an example, a specific CORESET to be used for SFN may be configured not to be included in any CORESET subset. Through this, when a specific CORESET is utilized for SFN purposes, the update-related ambiguity of the plurality of TCI states of the configured corresponding CORESET may be resolved. However, since the CORESET is not subject to common beam applicability, in order to change/update the TCI state of the CORESET, separate signaling according to the existing MAC-CE-based scheme may be required.

As another example, a specific CORESET to be used for SFN purpose may be included in one of the CORESET subsets, and a specific common TCI state linked/associated with the corresponding CORESET subset may be configured/updated to the TCI state of the corresponding CORESET. That is, in this case, the TCI state of the corresponding CORESET may be configured/updated using the specific common TCI state. As a specific example, referring to Example 2 described above, CORESET #2 may be included in CORESET subset #1 or CORESET subset #2. At this time, if the corresponding CORESET is "SFN-enabled state", one of the two TCI states configured in the corresponding CORESET may be configured/updated in correspondence with the common TCI state linked with the CORESET subset. If there is a subsequent DCI beam indication according to the case where the M value is 2 (like the M-DCI scheme), based on the newly indicated common TCI state, change/update for a TCI state, which is not changed/updated among the two TCI states configured in the SFN CORESET, may be performed. That is, whenever a DCI beam indication is present/received, two TCI states configured in SFN CORESET may be configured/updated in an alternating manner.

Alternatively, the above-described operation may be performed while changing the subset to which SFN CORESET belongs. As a specific example, in the first DCI beam indication when the M value is 2 (based on M-DCI), the SFN CORESET may be included in CORESET subset #1 so that the first TCI state may be updated by the corresponding common TCI status. And, in the subsequent DCI beam indication, the corresponding SFN CORESET may be included in CORESET subset #2 so that the second TCI state may be updated by the common TCI state. Alternatively, only a specific TCI state (e.g., a TCI state corresponding to CORESET subset ID) among two TCI states to be applied to SFN may be updated, and the remaining TCI states may be updated through separate signaling (e.g., CORESET TCI indication scheme reuse in Rel-15/16 NR standardization). In addition, when the TCI state is updated using the common TCI state for all CORESETs even when the M value is set to 1, the first TCI state may be updated by using the corresponding common TCI state for the SFN-enabled CORESET (i.e., SFN CORESET), and the second TCI state may be updated through separate signaling. Alternatively, when the corresponding SFN CORESET is disabled, the configured single TCI state may be configured/updated in correspondence with the common TCI state associated with the corresponding CORESET subset.

As another example, the SFN CORESET TCI state may be respectively configured/updated using a common TCI state linked/associated with each CORESET subset by including all of the specific CORESETs to be used for SFN purposes in the CORESET subset. As a specific example, referring to Example 2 described above, CORESET #2 may be included in both CORESET subset #1 and CORESET subset #2. If the corresponding CORESET is "SFN-enabled state", the two TCI states configured in the corresponding CORESET may be changed/updated in correspondence with the common TCI state connected to each CORESET subset. If the corresponding CORESET is "SFN disabled state", the single TCI state configured in the corresponding CORESET may be changed/updated in correspondence with the common TCI state #1 or the common TCI state #2 according to a predefined scheme.

Next, when the M value for SFN CORESET is 2, a beam configuration/update method independent of the CORESET subset is proposed.

The corresponding method may be a scheme considering the (S-DCI based) BWP in which a plurality of CORESET pools are not configured in the BWP to which the SFN CORESET belongs. Even if a CORESET pool does not exist, when a subset for PDCCH repetition transmission (i.e., a CORESET subset) is configured, the above-described CORESET subset-based beam configuration/update method may be applied.

As an example, (when the M value is greater than 1, and beam indications for different common TCI states #1/#2 are indicated by different DCIs), the configuration/update of the common TCI state within the corresponding BWP may be performed for CORESET(s) except for SFN CORESET, through the corresponding common TCI state. Alternatively, a method of configuring/updating a common TCI state for a specific (e.g., first) TCI state of SFN CORESET may be considered.

As another example, (when M value is greater than 1 and beam indication for different common TCI states #1/#2 is indicated by one DCI) each TCI state for SFN CORESET within the corresponding BWP may be changed/updated to common TCI status #1/#2. In addition, for CORESET(s) other than SFN CORESET, a method of operating by applying one of two common TCI states through a specific scheme may be considered.

That is, in a state in which a subset for CORESET is not configured, the TCI state(s) configured in the SFN CORE-SET and the remaining of the general CORESET may be changed/updated according to whether the DCI beam indication is an M-DCI-based scheme or an S-DCI-based scheme as in the above-mentioned examples.

Embodiment 2

This embodiment is about a method of dynamically setting whether enable/disable for SFN CORESET according to the M value configuration, when applying an operation according to common beam applicability through the unified TCI framework-based TCI state indication. Here, the M value may mean the number of TCI states set/indicated for the above-described M-TRP-based downlink transmission/reception and/or the number of objects to which a common beam change/update operation is applied.

This embodiment is about a beam configuration/update operation method considering whether to continue using CORESET (in which RRC enabler is configured) for SFN purposes considered in the above-mentioned Example 1, when operating common beam applicability according to TCI status indication and M value based on the unified TCI framework. In addition, according to the indication of an M value greater than 1 (e.g., M=2), based on whether the CORESET will be used for SFN and the method in Example 1 described above, a scheme in which the currently SFN-enabled CORESET is interpreted as disabled and operated may be possible. Conversely, in this case, a method in which SFN-disabled CORESET is interpreted as enabled and dynamically operated may be possible.

In the proposed method of this embodiment, when a specific CORESET belongs to all of the CORESET subsets, the corresponding CORESET may be considered as an SFN-enabled CORESET, and the SFN may be turned on/off through a dynamic scheme.

For example, a method of changing the configuration/setting of the CORESET subset through MAC-CE and/or DCI may be considered. That is, through a separate indicator included in the MAC-CE or DCI, the corresponding CORE-SET may be configured/indicated to belong to both CORE-SET subsets, or may be configured/instructed to belong to only one of the specific CORESET subsets. In the latter case, it may be interpreted as an operation of turning off the SFN of the corresponding CORESET.

For another example, a method of configuring the CORE-SET subset configuration through higher layer signaling and, through the TCI state indication through MAC-CE or DCI, indicating by including information on whether the corresponding TCI state(s) is applied to the SFN CORESET and/or whether SFN is enabled may be considered. Here, the indicated TCI state may correspond to the indicated TCI state based on the unified TCI framework. That is, the configuration of CORESET may be fixed by the RRC configuration (e.g., semi-static configuration), but through MAC-CE and/or DCI, information on whether to apply the corresponding TCI state for SFN CORESET and/or whether the SFN is on/off may be indicated.

As a specific example, based on the example in Embodiment 1 described above (e.g., an example when a specific CORESET to be used for SFN use is included in one of the CORESET subsets), an operation of indicating to be simultaneously changed/updated two TCI states associated with SFN CORESET to one indicated specific common TCI state #1 or common TCI state #2 may be considered. The corresponding operation may mean that SFN off/deactivation is performed by the corresponding TCI indication without additional MAC-CE configuration.

In addition, as another specific example, based on the example in Embodiment 1 described above (e.g., an example in which a specific CORESET to be used for SFN use is included in all of the CORESET subset(s)), although the SFN enabler is configured through RRC signaling, it may be indicated to change/update two common TCI states for CORESET in a state of SFN off/deactivation. In this case, the corresponding CORESET may be interpreted as SFN on/activated, and it may mean that SFN on/activation is performed based on the corresponding TCI indication.

Figure 8:
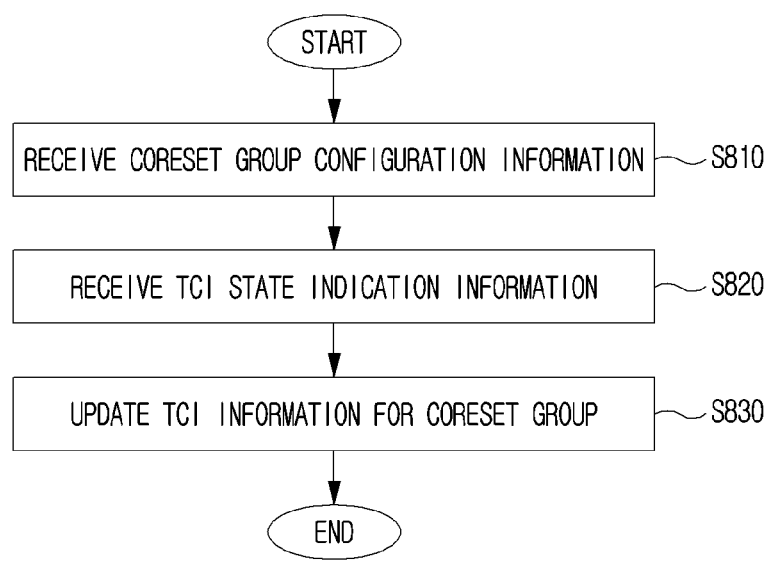
FIG. 8 is a diagram illustrating an operation of a terminal in a downlink transmission/reception method according to an embodiment of the present disclosure.

FIG. 8 is a diagram illustrating an operation of a terminal in a downlink transmission/reception method according to an embodiment of the present disclosure.

FIG. 8 illustrates an operation of operation of a terminal based on the previously proposed method (e.g., any one or a combination of Embodiments 1 to 2 and detailed embodiments thereof). The example of FIG. 8 is for convenience of description, and does not limit the scope of the present disclosure. Some step(s) illustrated in FIG. 8 may be omitted depending on circumstances and/or configuration. In addition, the base station in FIG. 8 is only one example, and may be implemented as the apparatus illustrated in FIG. 10 below. For example, the processor 102/202 of FIG. 10 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Figure 10:
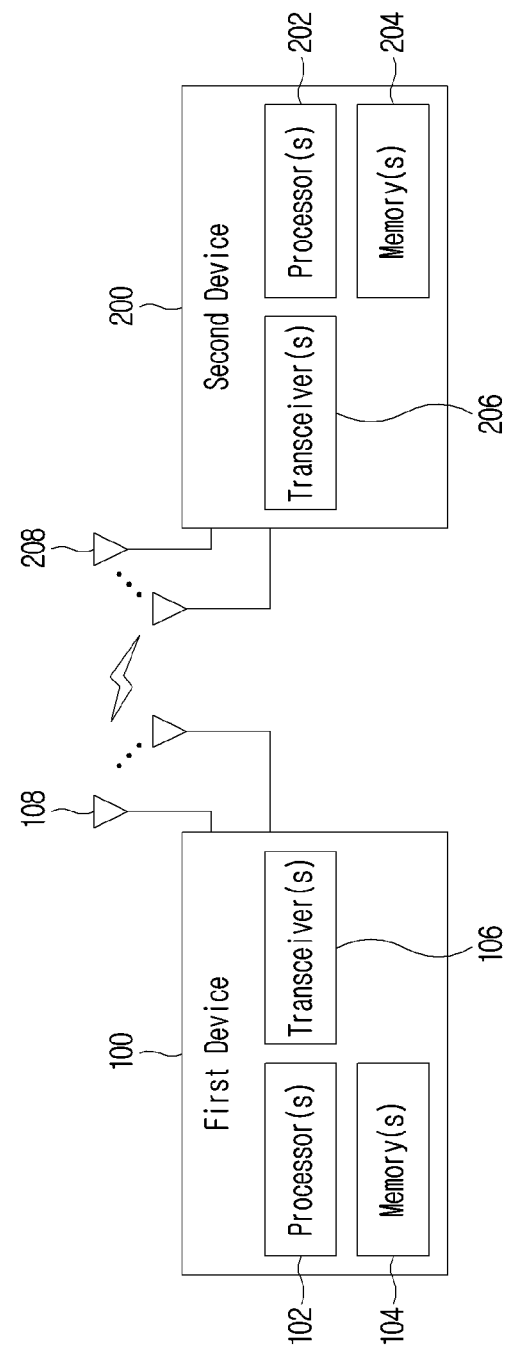
FIG. 10 is a diagram which illustrates a block diagram of a wireless communication device according to an embodiment of the present disclosure.

Also, the operation of FIG. 8 may be processed by one or more processors (102, 202) in FIG. 10, and the operation of FIG. 8 may be stored in a memory (e.g., one or more memories (104, 204) in FIG. 10, in the form of instructions/programs (e.g., instructions, executable code) for driving at least one processor (102, 202) in FIG. 10.

Referring to FIG. 8, in step S810, the terminal may receive configuration information for two or more CORE-SET groups from the base station.

Here, the CORESET group may correspond to the CORE-SET subset (e.g., CORESET subset #1, CORESET subset

2) in the above-described embodiments (e.g., embodiment 1, embodiment 2). And, each CORESET group may consist of at least one CORESET.

For example, at least one of the two or more CORESET groups may include a specific CORESET associated with multiple TCI states. The specific CORESET may be a CORESET configured in relation to SFN-based PDCCH repetition transmission, and may correspond to the above-described SFN (purpose) CORESET.

In step S820, the terminal may receive information indicating two or more TCI states from the base station.

Here, the TCI state indicated by the corresponding information may correspond to a common TCI state (e.g., common TCI state #1, common TCI state #2) in the above-described embodiments (e.g., embodiment 1, embodiment 2). For example, the two or more TCI states may be based on a unified TCI (framework) indicated by DCI. In addition, the two or more CORESET groups may be associated with the two or more TCI states by one-to-one mapping.

In step S830, the terminal may update the TCI state information for the two or more CORESET groups based on the two or more TCI states. Here, the TCI state information may mean at least one TCI state associated with each CORESET included in each CORESET group.

For example, as in the above-described embodiments (e.g., Embodiment 1, Embodiment 2), when the specific CORESET (i.e., SFN CORESET) is included in any one of the two or more CORESET groups, the TCI state information for the specific CORESET (e.g., two TCI states) may be updated based on a TCI state (e.g., common TCI status #1 or common TCI status #2) associated with a CORESET group including the specific CORESET among the two or more TCI states (e.g., common TCI state #1 and common TCI state #2). At this time, when the specific CORESET is SFN-enabled through higher layer signaling, one of the plurality of TCI states (e.g., any one of TCI state #1 and TCI state #2 associated with SFN CORESET) may be updated based on the TCI state associated with the CORESET group including the specific CORESET.

In addition, based on a subsequent indication of two or more TCI states related to the two or more CORESET groups (e.g., an indication of common TCI states by a subsequent DCI), a previously not updated TCI state among the TCI state information for the specific CORESET may be updated based on the corresponding subsequent indication. And/or, based on a subsequent indication of two or more TCI states related to the two or more CORESET groups, the CORESET group including the specific CORESET may be changed (e.g., CORESET subset switching).

For another example, when the specific CORESET (i.e., SFN CORESET) is included in both of the two or more CORESET groups, as in the above-described embodiments (e.g., Embodiment 1 and Embodiment 2), TCI state information (e.g., two TCI states) for the specific CORESET may be updated based on the TCI state associated with each of the two or more CORESET groups (e.g., common TCI state #1 or common TCI state #2).

In addition, although not shown in FIG. 8, the terminal may receive, from the base station, indication information for changing the configuration information for the two or more CORESET groups. In this case, the corresponding indication information may be transmitted by being included in the MAC-CE and/or DCI.

Figure 9:
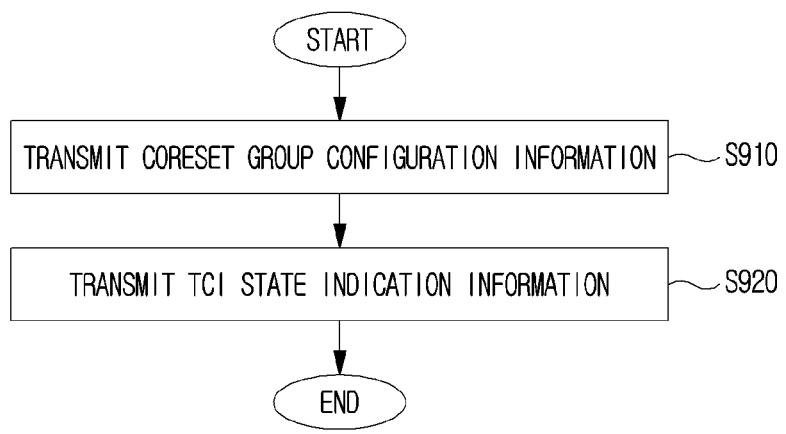
FIG. 9 is a diagram illustrating an operation of a base station for a downlink transmission/reception method according to an embodiment of the present disclosure.

FIG. 9 is a diagram illustrating an operation of a base station in a downlink transmission/reception method according to an embodiment of the present disclosure.

FIG. 9 illustrates an operation of operation of a base station based on the previously proposed method (e.g., any one or a combination of Embodiments 1 to 2 and detailed embodiments thereof). The example of FIG. 9 is for convenience of description, and does not limit the scope of the present disclosure. Some step(s) illustrated in FIG. 9 may be omitted depending on circumstances and/or configuration. In addition, the base station in FIG. 9 is only one example, and may be implemented as the apparatus illustrated in FIG. 10 below. For example, the processor 102/202 of FIG. 10 may control to transmit and receive channel/signal/data/ information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Also, the operation of FIG. 9 may be processed by one or more processors (102, 202) in FIG. 10, and the operation of FIG. 8 may be stored in a memory (e.g., one or more memories (104, 204) in FIG. 10, in the form of instructions/ programs (e.g., instructions, executable code) for driving at least one processor (102, 202) in FIG. 10.

Referring to FIG. 9, in step S910, the base station may transmit configuration information for two or more CORESET groups to the terminal.

Here, the CORESET group may correspond to the CORESET subset (e.g., CORESET subset #1, CORESET subset #2) in the above-described embodiments (e.g., embodiment 1, embodiment 2). And, each CORESET group may consist of at least one CORESET.

For example, at least one of the two or more CORESET groups may include a specific CORESET associated with multiple TCI states. The specific CORESET may be a CORESET configured in relation to SFN-based PDCCH repetition transmission, and may correspond to the above-described SFN (purpose) CORESET.

In step S920, the base station may transmit information indicating two or more TCI states to the terminal.

Here, the TCI state indicated by the corresponding information may correspond to a common TCI state (e.g., common TCI state #1, common TCI state #2) in the above-described embodiments (e.g., embodiment 1, embodiment 2). For example, the two or more TCI states may be based on a unified TCI (framework) indicated by DCI. In addition, the two or more CORESET groups may be associated with the two or more TCI states by one-to-one mapping.

Two or more TCI states indicated in step S920 may be used to update TCI state information for the two or more CORESET groups. In this case, when the base station later transmits the PDCCH based on the corresponding two or more CORESET groups, the corresponding PDCCH transmission may be performed based on the updated TCI state information.

For example, as in the above-described embodiments (e.g., Embodiment 1, Embodiment 2), when the specific CORESET (i.e., SFN CORESET) is included in any one of the two or more CORESET groups, the TCI state information for the specific CORESET (e.g., two TCI states) may be updated based on a TCI state (e.g., common TCI status #1 or common TCI status #2) associated with a CORESET group including the specific CORESET among the two or more TCI states (e.g., common TCI state #1 and common TCI state #2). At this time, when the specific CORESET is SFN-enabled through higher layer signaling, one of the plurality of TCI states (e.g., any one of TCI state #1 and TCI state #2 associated with SFN CORESET) may be updated based on the TCI state associated with the CORESET group including the specific CORESET.

In addition, based on a subsequent indication of two or more TCI states related to the two or more CORESET groups (e.g., an indication of common TCI states by a subsequent DCI), a previously not updated TCI state among the TCI state information for the specific CORESET may be updated based on the corresponding subsequent indication. And/or, based on a subsequent indication of two or more TCI states related to the two or more CORESET groups, the CORESET group including the specific CORESET may be changed (e.g., CORESET subset switching).

For another example, when the specific CORESET (i.e., SFN CORESET) is included in both of the two or more CORESET groups, as in the above-described embodiments (e.g., Embodiment 1 and Embodiment 2), TCI state information (e.g., two TCI states) for the specific CORESET may be updated based on the TCI state associated with each of the two or more CORESET groups (e.g., common TCI state #1 or common TCI state #2).

In addition, although not shown in FIG. 9, the base station may transmit, to the terminal, indication information for changing the configuration information for the two or more CORESET groups. In this case, the corresponding indication information may be transmitted by being included in the MAC-CE and/or DCI.

General Device to which the Present Disclosure May be Applied

FIG. 13 illustrates a block diagram of a wireless communication device according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
receiving configuration information for one or more control resource groups including a control resource related to a plurality of spatial parameters;
receiving information for one or more spatial parameters; and
determining spatial information for the one or more control resource groups based on the one or more spatial parameters,
wherein, based on a single spatial parameter being indicated for the control resource, one of the plurality of spatial parameters is updated to the single spatial parameter.

2. The method of claim 1,
wherein the control resource is configured for repetition transmission of a downlink control channel based on a single frequency network (SFN) scheme.

3. The method of claim 1,
wherein the one or more spatial parameters are based on a unified spatial parameter indicated by downlink control information (DCI).

4. The method of claim 1,
wherein the one or more parameters are respectively indicated for the one or more control resource groups in a one-to-one manner.

5. The method of claim 1,
wherein, based on a plurality of control resource groups being configured, the single spatial parameter corresponds to a spatial parameter indicated for a control resource group including the control resource.

6. The method of claim 1, further comprising:
receiving information for enabling the control resource through a higher layer signaling.

7. The method of claim 1,
wherein a remaining spatial parameter which is not previously updated among the plurality of spatial parameters is updated based on another information for updating the spatial information subsequent to the information.

8. The method of claim 1,
wherein the information is transferred through at least one of a medium access control-control element (MAC-CE) or downlink control information (DCI).

9. An apparatus comprising:
at least one transceiver; and
at least one processor coupled with the at least one transceiver,
wherein the at least one processor is configured to:
receive configuration information for one or more control resource groups including a control resource related to a plurality of spatial parameters;
receive information for one or more spatial parameters; and
determine spatial information for the one or more control resource groups based on the one or more spatial parameters,
wherein, based on a single spatial parameter being indicated for the control resource, one of the plurality of spatial parameters is updated to the single spatial parameter.

10. The apparatus of claim 9,
wherein the control resource is configured for repetition transmission of a downlink control channel based on a single frequency network (SFN) scheme.

11. The apparatus of claim 9,
wherein the one or more spatial parameters are based on a unified spatial parameter indicated by downlink control information (DCI).

12. The apparatus of claim 9,
wherein the one or more parameters are respectively indicated for the one or more control resource groups in a one-to-one manner.

13. The apparatus of claim 9,
wherein, based on a plurality of control resource groups being configured, the single spatial parameter corresponds to a spatial parameter indicated for a control resource group including the control resource.

14. The apparatus of claim 9,
wherein the processor is configured to receive information for enabling the control resource through a higher layer signaling.

15. The apparatus of claim 9,
wherein a remaining spatial parameter which is not previously updated among the plurality of spatial parameters is updated based on another information for updating the spatial information subsequent to the information.

16. An apparatus comprising:
at least one transceiver; and
at least one processor coupled with the at least one transceiver,
wherein the at least one processor is configured to:
transmit configuration information for one or more control resource groups including a control resource related to a plurality of spatial parameter; and
transmit information for one or more spatial parameters;
wherein spatial information for the one or more control resource groups is updated based on the one or more TCI states, and
wherein, based on a single spatial parameter being indicated for the control resource, one of the plurality of spatial parameters is updated to the single spatial parameter.

17. The method of claim 1,
wherein a spatial parameter to be updated with the single spatial parameter corresponds to a spatial parameter related to an identifier of a control resource group including the control resource.

18. The apparatus of claim 9,
wherein a spatial parameter to be updated with the single spatial parameter corresponds to a spatial parameter related to an identifier of a control resource group including the control resource.

* * * * *